United States Patent
Lundsgaard et al.

(10) Patent No.: US 8,660,101 B2
(45) Date of Patent: Feb. 25, 2014

(54) METHOD AND APPARATUS FOR UPDATING PRESENCE STATE OF A STATION IN A WIRELESS LOCAL AREA NETWORK (WLAN)

(75) Inventors: Soren K. Lundsgaard, Inverness, IL (US); Puneet Batta, San Jose, CA (US)

(73) Assignee: Motorola Solutions, Inc., Schaumburg, IL (US)

( * ) Notice: Subject to any disclaimer, the term of this patent is extended or adjusted under 35 U.S.C. 154(b) by 570 days.

(21) Appl. No.: 12/649,574

(22) Filed: Dec. 30, 2009

(65) Prior Publication Data

US 2011/0158209 A1 Jun. 30, 2011

(51) Int. Cl.
*H04W 4/00* (2009.01)

(52) U.S. Cl.
USPC ...... 370/338; 370/310; 455/456.1; 455/456.5

(58) Field of Classification Search
None
See application file for complete search history.

(56) References Cited

U.S. PATENT DOCUMENTS

| | | | | |
|---|---|---|---|---|
| 5,519,706 | A * | 5/1996 | Bantz et al. | 455/435.2 |
| 6,973,052 | B2 * | 12/2005 | Wang et al. | 370/278 |
| 7,333,464 | B2 | 2/2008 | Yang et al. | |
| 2002/0090947 | A1 * | 7/2002 | Brooks et al. | 455/436 |
| 2002/0138627 | A1 * | 9/2002 | Frantzen et al. | 709/227 |
| 2004/0127253 | A1 * | 7/2004 | Hauptvogel et al. | 455/556.2 |
| 2005/0009542 | A1 | 1/2005 | Oprescu-Surcobe et al. | |
| 2005/0113077 | A1 * | 5/2005 | Bushnell et al. | 455/417 |
| 2005/0265296 | A1 * | 12/2005 | Zhang et al. | 370/338 |
| 2006/0059551 | A1 * | 3/2006 | Borella | 726/13 |
| 2006/0094476 | A1 * | 5/2006 | Guy | 455/574 |

FOREIGN PATENT DOCUMENTS

| | | | | |
|---|---|---|---|---|
| EP | 1931110 A1 * | 6/2008 | | H04M 7/00 |
| WO | 2005072494 A2 | 8/2005 | | |
| WO | 2005104569 A2 | 11/2005 | | |

OTHER PUBLICATIONS

International Search Report & Written Opinion mailed on Apr. 26, 2011 for International Application No. PCT/US2010/059397.

* cited by examiner

*Primary Examiner* — Jason Mattis
*Assistant Examiner* — James P Duffy

(57) ABSTRACT

A method and apparatus for presence state determination at an access point of a station determines whether a station associated with the access point is responsive to the access point to indicate the station is "present" or "not present". The access point informs a presence server when the station's presence state changes. The presence server does not therefore need to rely on presence handshaking between the presence server and the station.

2 Claims, 8 Drawing Sheets

METHOD AND APPARATUS FOR UPDATING PRESENCE STATE OF A STATION IN A WIRELESS LOCAL AREA NETWORK (WLAN)

FIELD OF THE DISCLOSURE

The present disclosure relates generally to wireless local area networks (WLANs) and more particularly to providing presence state information of wireless stations operating in a WLAN.

BACKGROUND

The development of wireless networking has provided mobility to users while allowing them to remain in contact with others such as professional associates and family members. As the capacity and coverage of these systems have increased, the types and quantity of services being implemented has also increased. These services include communication modes, data applications, messaging applications, and the like. The increasing availability of services and applications has driven continued enhancements in mobile device design. For example, WLANs were originally primarily used by computing devices, such as laptop computers. WLANs have since evolved to support voice communication in addition to applications and services that require high speed broadband service such as streaming video. Today, it is increasingly common for mobile communication devices to include means for accessing WLANs in addition to traditional mobile cellular networks. As a result, there has been substantial overlap in the range of services and applications used among mobile communication devices and more conventional portable computing devices.

One service that is gaining widespread popularity on mobile communication devices is instant messaging (IM). Instant messaging can be more useful than short message service (SMS) messaging, sometimes referred to as "texting," and its multimedia counterpart, media messaging service (MMS). SMS and MMS allow users to send messages to other users, but with no assurance that the target of the message is presently available. Instant messaging, on the other hand, typically maintains presence information for each IM user so that other users can be informed of the presence state of other users of interest to them.

A conventional IM system uses an IM server which maintains presence information for all subscribing users. Presence of a user can be identified, for example, as "offline," "busy," "available," and on the like. An IM client application on the user's device interacts with the IM server to keep the IM server's presence information current, which typically involves the IM server frequently verifying each user's presence status by sending handshake messages. This constant handshaking occurs between the IM client on the user's device and the IM server when the IM client is instantiated and the user's device is online. On a conventional computing device, the power used to process periodic presence handshaking is not particularly significant, but for mobile communication devices it can be substantial because such devices have much smaller batteries and are expected to operate for longer periods of time without having to recharge or change batteries compared to computing devices. Furthermore, in an enterprise WLAN, the presence handshaking can consume a substantial portion of network capacity.

Accordingly, there is a need for a means by which presence information can be maintained in a network which reduces the processing burden on terminal devices, such as mobile communication devices, and which reduces network handshaking traffic over conventional presence systems.

BRIEF DESCRIPTION OF THE FIGURES

The accompanying figures, where similar reference numerals refer to identical or functionally similar elements throughout the separate views, together with the detailed description below, are incorporated in and form part of the specification and serve to further illustrate embodiments of concepts that include the claimed invention, and explain various principles and advantages of those embodiments.

Figure 1:
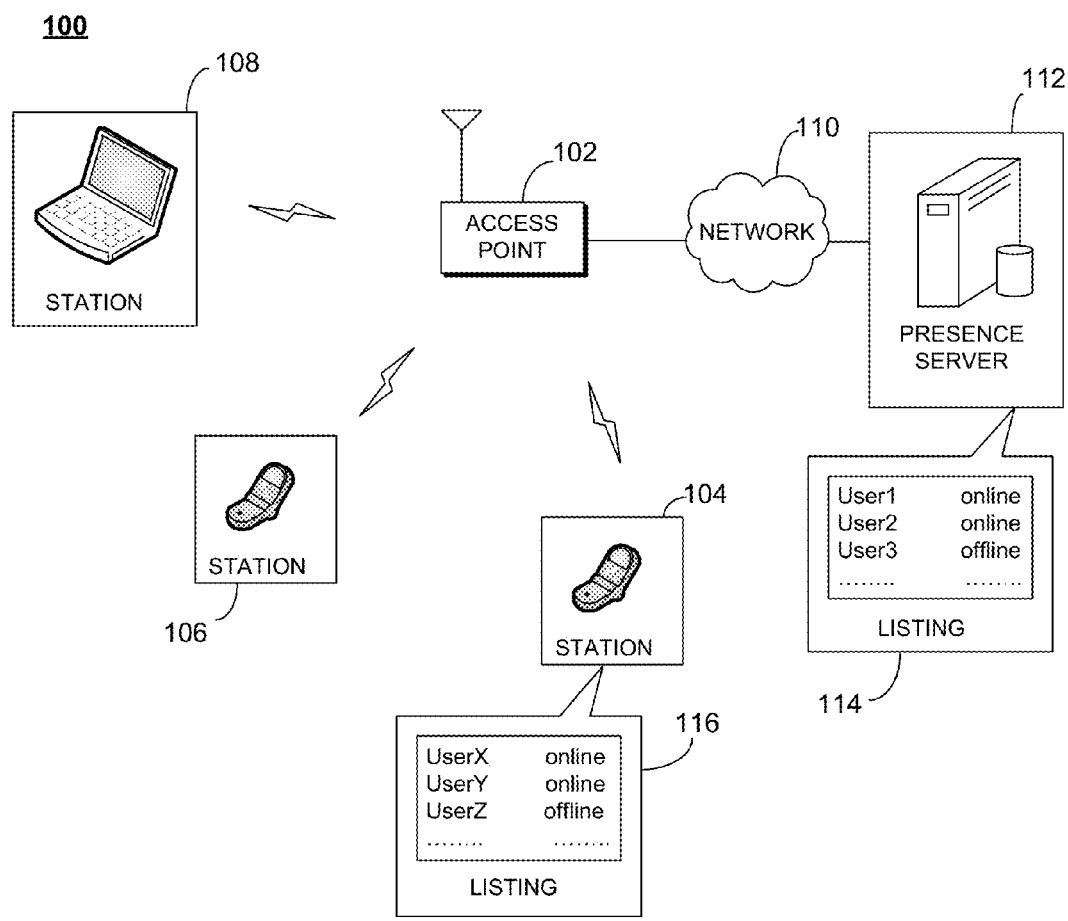
FIG. 1 is a block diagram of a wireless local area network (WLAN) that supports station presence in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides a method and apparatus for maintaining the state of a wireless station associated with a WLAN access point at the access point. The access point determines when there is a change of the station's presence state, and upon determining that the station's presence state has changed, the access point informs a presence server of the change in the station's presence state. The presence server maintains a state value of the station, and other such stations, for use by other stations and users to determine whether a given user be contacted at any given time.

FIG. 1 is a block diagram of a wireless local area network (WLAN) 100 that supports station presence in accordance with some embodiments. A WLAN access point (AP) 102 supports wireless communication with one or more WLAN stations such as stations 104, 106, and 108, for example. Examples of wireless stations can include laptop computers, as well as WLAN-enabled mobile communication devices, personal digital assistants, and other such devices. The AP 102 provides a wireless communication interface in the vicinity of the AP 102 according to a protocol, such as that specified by any of the Institute of Electronic and Electrical Engineers (IEEE) specifications 802.11. Those skilled in the art will realize, however, that the teachings of the present disclosure are not limited to such protocols and can be applied to a wide variety of wireless systems, including, for example, IEEE 802.16 Worldwide Interoperability for Microwave Access (WiMAX). Any of the IEEE standards or specifications referred to herein can be obtained at http://standards-.ieee.org/getieee802/index.html or by contacting the IEEE at IEEE, 445 Hoes Lane, PO Box 1331, Piscataway, N.J. 08855-1331, USA.

The AP 102 provides access to a network 110, which can include a wide area packet network and the Internet. The AP 102 is operably coupled to a presence server 112 via the network 110. The presence server 112 maintains a presence state for stations operating in the shown WLAN and can further maintain presence states for other stations operating in other networks which are operably coupled to the presence server 112 in kind. The term "maintaining a presence state" hereinafter means that for each station supported by the presence server, the presence server keeps an operational state value for the station. For example, a station's state can be "present," "not present," "idle," "online," "offline," "busy," and the like. For example, the presence server can maintain a list of stations by their user name, and their associated state, as indicated by listing 114 which can be stored in a memory of the presence server 112.

Each station 104, 106, and 108 utilizing the presence server 112 can have a presence application running on the station which can communicate with the presence server 112 and which can thereby determine the state of other stations and users that are also utilizing the presence server 112, and that are of interest to the user of the station. A user of station 104 can, for example, see a listing 116 of various other stations/users and their respective present presence states. The listing 116, in some embodiments, can be displayed on a display of the station by a presence application running on the station.

Figure 2:
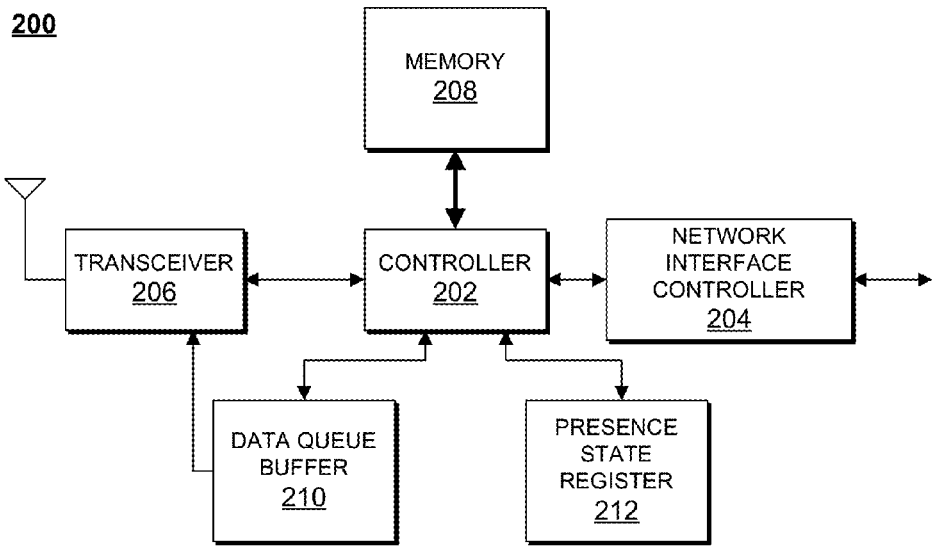
FIG. 2 is a schematic block diagram of a WLAN access point (AP) in accordance with some embodiments.

FIG. 2 is a schematic block diagram of a WLAN access point (AP) 200 in accordance with some embodiments. The AP 200 includes a controller 202 which includes one or more microprocessors that control operation of the AP 200. The controller 202 is operably coupled to a memory 208, which can be, for example, a computer readable storage medium. The memory 208 can represent an aggregation of memory which can include various different memory components including read only memory (RAM), random access memory (RAM), non-volatile programmable memory, and on the like. It will be appreciated by those of ordinary skill in the art that the memory 208 can be integrated within the AP 200, or alternatively, can be at least partially contained within an external memory such as a memory storage device. The memory storage device, for example, can be a subscriber identification module (SIM) card.

Typically the memory 208 includes a long term storage component that stores operating system and application code, as well as boot code which can be instantiated in RAM to commence operation of the AP 200. RAM can be further used for scratchpad memory operations, such as storing variable, arrays, and other data structures. The memory 208 includes instruction code which programs the controller to operate in accordance with the teachings of the present disclosure.

The controller 202 is further operably coupled to a network interface controller (NIC) 204 which facilitates communication with a network, and a transceiver 206 which operates the air interface to support wireless communication with stations. In an alternative embodiment (not shown), instead of a transceiver, the AP 200 can include a receive antenna and a receiver for receiving signals from the WLAN and a transmit antenna and a transmitter for transmitting signals to the WLAN. It will be appreciated by one of ordinary skill in the art that other similar electronic block diagrams of the same or alternate type can be utilized for the AP 200.

The AP 200 further includes a data queue buffer 210 and a presence state register 212, each of which can be included in memory 208 or implemented in other memory either internally or externally. The data queue buffer 210 is used to queue outgoing data for stations associated with the AP 200. Stations can operate in a powersave mode where they are unable to receive signals from the AP 200, but occasionally "wake up" and poll the AP 200 to receive data queued at the AP 200 that is destined for the station. The presence state register 212 is used by the AP 200 to maintain a presence state for one or more stations associated with the AP 200. The presence state is an indication of whether the station is presently available for communication, and is separate from an association state. While a station remains associated with the AP 200, for example, it can momentarily fall out of coverage and be unable to receive signals from the AP 200, or be unable to transmit signals with sufficient strength to reach the AP 200. According to the present teachings, the AP 200 determines a state of the station, and in particular whether the station is "present" or "not present." A state of "present" indicates that the station is presently able to exchange signals with the AP 200, and "not present" therefore indicates that the station is not able to exchange signals with the AP 200. By determining this level of presence at the AP 200, network traffic conventionally associated with presence handshaking between a client, such as a station, and a presence server can be substantially reduced. The AP 200 can monitor and determine the presence state of a station and inform the presence server upon a change in the station's presence state. The AP 200 only needs to update the presence server when the station's presence state changes. Furthermore, the AP 200 can determine the station's presence state using techniques that will not require the station to process and respond to high level, application oriented handshake messages to an application running on the station.

Figure 3:
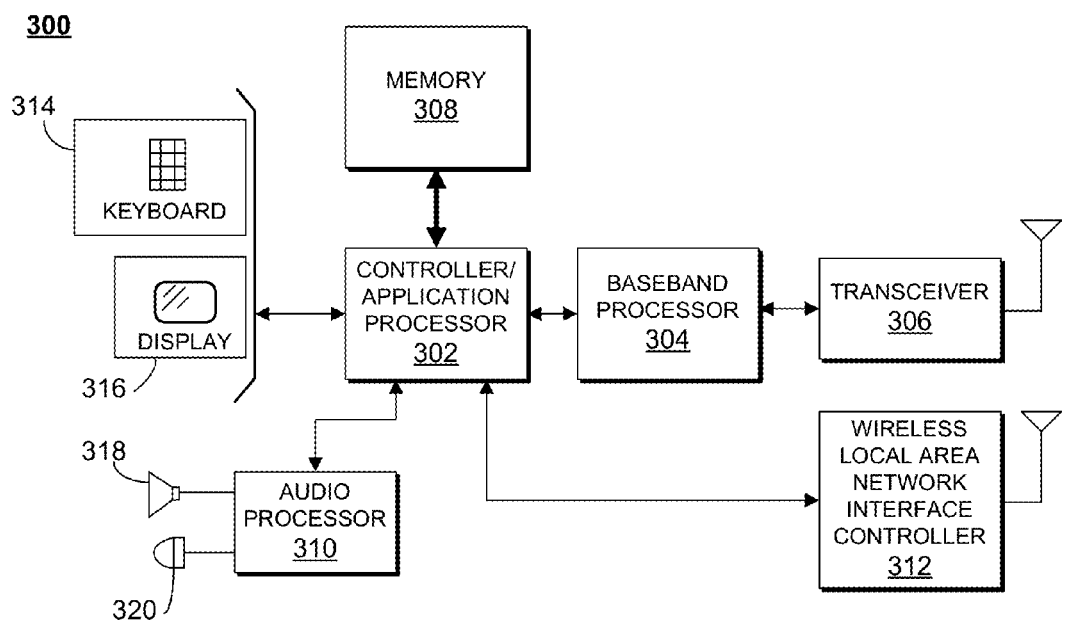
FIG. 3 is schematic block diagram of a wireless station in accordance with some embodiments.

FIG. 3 is schematic block diagram of a station 300 in accordance with some embodiments. The station 300 is a wireless station and can operate using battery power or an external power source. The station 300 can be any type of known wireless station including a laptop computer, a mobile communication device, a personal digital assistant, and so on. The station 300 illustrated in FIG. 3 is an example of a WLAN-enabled mobile communication device. A typical station 300 includes a controller or application processor 302. The application processor 302 operates higher layers of software, as well as operating systems and user interface layers. The application processor 302 is operably coupled to computer readable storage memory 308, which can include ROM, RAM, and various volatile and non-volatile types of memory. One portion of the memory 308 contains instruction code for operating the station, including operating system code, user interface code, and code for various applications, among other types of code. It will be appreciated by those of ordinary skill in the art that the memory 308 can be integrated within the station, or alternatively, can be at least partially contained within an external memory such as a memory storage device.

The memory storage device, for example, can be a subscriber identification module (SIM) card.

The application processor 302 is further operably coupled to a baseband processor 304, which performs a variety of signaling operations, and can typically be implemented with a digital signal processor and supporting components, as is known. Among other functions, the baseband processor 304 formats data to be transmitted, which can include encoding, digital filtering, and so on. The processed data is sent to a transceiver 306 which transmits the data via digital modulation. The transceiver 306 also receives and demodulates signals and provides the received data to the application processor 302. Accordingly, the transceiver 306 includes radio operation components for filtering, modulating, demodulating, and amplifying signals. The transceiver 306 can be used to communicate with cellular-based mobile communication networks. In an alternative embodiment (not shown), instead of a transceiver, the station 300 can include a receive antenna and a receiver for receiving signals from the WLAN, and a transmit antenna and a transmitter for transmitting signals to the WLAN. It will be appreciated by one of ordinary skill in the art that other similar electronic block diagrams of the same or alternate type can be utilized for the station 300.

The station 300 can further include an audio processor 310 for processing voice and other audio signals. The audio processor 310 converts digital audio signals to be played to a user to analog signals that are played over a speaker 318. The user can likewise speak into a microphone 320 to produce analog audio signals that are digitized by the audio processor 310.

To facilitate WLAN operation, the station includes a WLAN network interface controller (NIC) 312. The WLAN NIC 312 wirelessly links to an access point, such as AP 200 shown in FIG. 2, which contains its own controller for operating the WLAN NIC 312. The WLAN NIC 312 can be operated independently of the rest of the station 300, when the station 300 is otherwise placed into a low power or powersave mode. The WLAN NIC 312 can also be put into a low power mode, and periodically power up ("wake up") to scan a beacon and other signals broadcast by the AP to determine if other components of the station 300 need to power up to respond to the AP. If so, then the WLAN NIC 312 can commence an operation to power up the application processor 302 to perform an appropriate process. If not, then the WLAN NIC 312 simply goes back to a low power mode. Powersave operation of WLAN-enable stations is well known, and includes signaling protocols for a variety of operations, such as, for example, determining that the AP has queued data that is destined for the station 300.

To facilitate operation by a user, the station 300 further includes a user interface, including, for example, a keypad 314 and other button entry means, and a graphical display 316 for displaying information to the user. Additional components can be included, such as audio transducers for generating alert or ring tones, and buzzers for tactile alerts for silent mode operation. The keypad 314 can include standard telephone buttons as well as buttons for other operations, character entry, and menu selection, among other operations.

Figure 4:
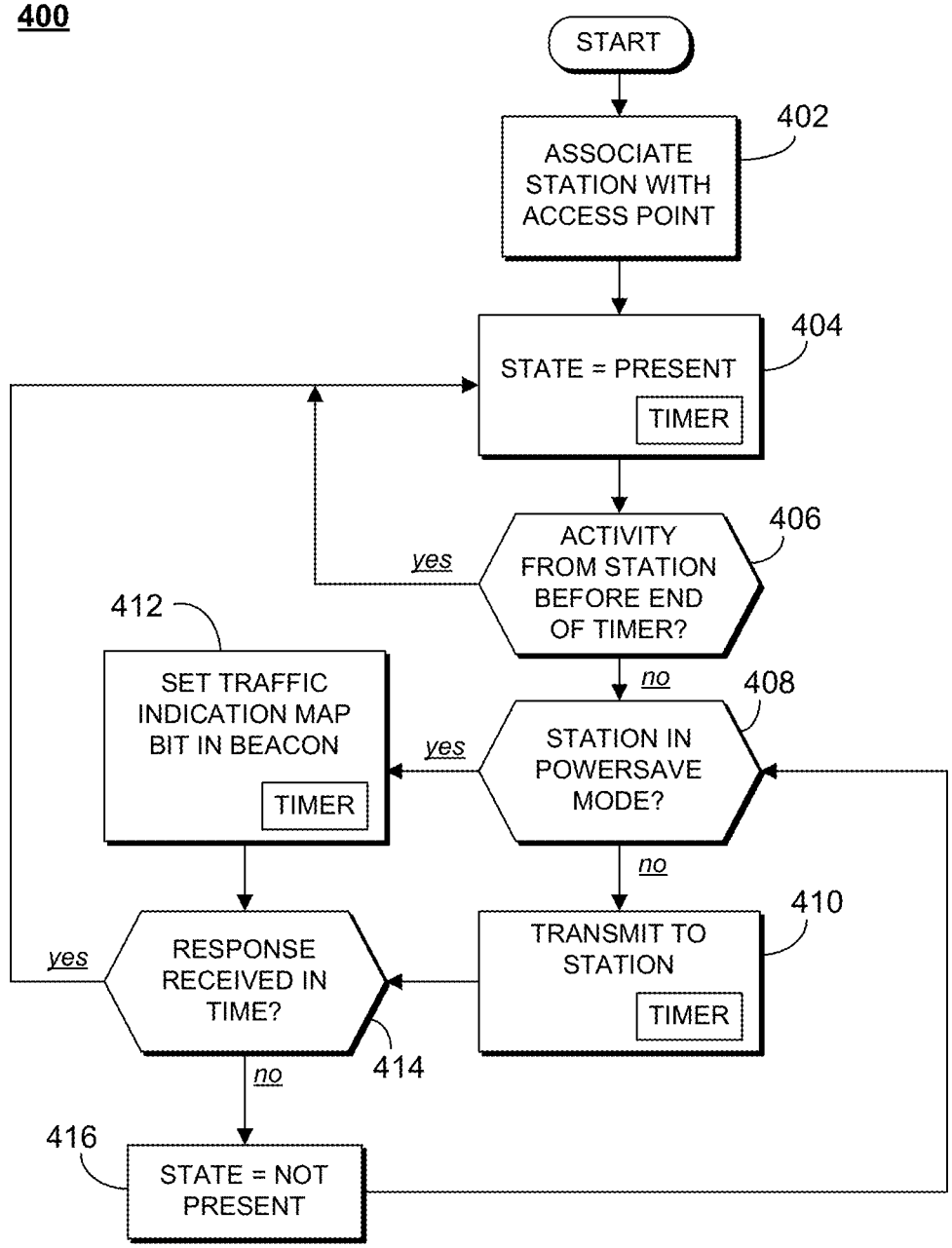
FIG. 4 is a flowchart of a method of updating presence in a WLAN in accordance with some embodiments.

FIG. 4 is a flowchart of a method 400 of updating presence in a WLAN in accordance with some embodiments. The method commences when a station associates with the AP (402). Association is a higher level operation that causes the AP to assume the station is in the vicinity of the AP generally until either the station de-associates, or a substantial period of time passes. A station's association state is separate from its presence state. Upon association, though, which requires an exchange of signals between the station and the AP, the AP initializes the station's presence state in a state variable maintained in a presence state register or equivalent memory and data structure in the AP. The station's presence station is first set to "present," (404) indicating that the station is likely able to exchange signals with the AP, and is not out of coverage. A timer is then commenced. The AP then determines if it has received any activity, in the form of signals, from the station before the timer expires (406). The activity can be the station sending data to the AP to be forwarded over the network, for example. Any activity received at the AP from the station will reset the time and maintain the station's presence state as "present." However, if the AP does not receive any indication of activity from the station, the AP can then commence attempting to provoke a response from the station. The station can first determine whether the station is operating in a powersave mode (408) which can have been indicated upon association, or subsequent to association with the AP by the station. If the station is operating in a powered mode, for example not in a powersave mode, as when powered by an external source such as an alternating current (AC) adapter, the station will be able to receive a signal asynchronously transmitted from the AP, assuming it is still "present." Accordingly, the AP then commences transmitting a signal to the station and commencing another timer (410). The signal can be, for example, a NULL frame of data. The AP then determines if a response was received from the station before expiration of the second timer (414), such as an acknowledgement (ACK) corresponding to the signal transmitted by the AP to the station. It will be appreciated by those of ordinary skill in the art that the station can transmit a message or data unrelated to the AP's transmission before it responds to the AP's transmission. When the AP receives a response or any other suitable signal from the station prior to expiration of the second timer, the AP maintains the station's presence state as "present" and there is no need to indicate a change of presence state to the presence server. However, when the station fails to receive a response from the station at 414, the AP then changes the station's presence state to "not present" (416), and indicates the change of presence state to the presence server.

When the station is operating in a powersave mode, the AP cannot simply transmit to the station because the station's WLAN NIC will likely be powered off Instead, the AP broadcasts a beacon for all stations associated with the AP operating in powersave mode, and in the beacon there is a traffic indication map (TIM) for each station. A station operating in powersave mode has its WLAN NIC periodically power up, scan the beacon, and determine based on the TIM, whether the station needs to power up and retrieve data from the AP. The present teachings utilize this operation for the purpose of determining the station's presence state. Once the AP sets the TIM in the beacon transmitted by the AP, and it will typically be repeated for a period of time, the AP commences a timer (412). Similarly to powered mode, the AP then determines if a response has been received from the station operating in powersave mode (414). To impose as little processing requirement as possible on the station, the AP can queue a NULL frame of data upon setting the TIM. Once the station's WLAN NIC powers up, receives the TIM indicating the AP has data queued at the AP that is destined for the station, the station's WLAN NIC will then poll the AP for the data. Upon receiving the NULL frame from the AP, however, the WLAN NIC will take no further action other than, perhaps, sending an ACK. Receiving the NULL frame does not cause the WLAN NIC to power up the rest of the station as no response is required. When the AP does not receive a response within the timer period, the station's presence state is changed to "not present" if it was "present" and the AP indicates the change of state to the presence server.

Once the station's presence state is changed to "not present," the method can continue to loop or repeat processes 408, 410/412, and 414 until the station responds appropriately, indicating the station is now present. The AP then changes the station's presence state to "present" (404), and then indicates the change of presence state to the presence server. The method then continues looping through the method's processes, changing the presence state when appropriate and indicating presence state changes to the presence server.

Figure 5:
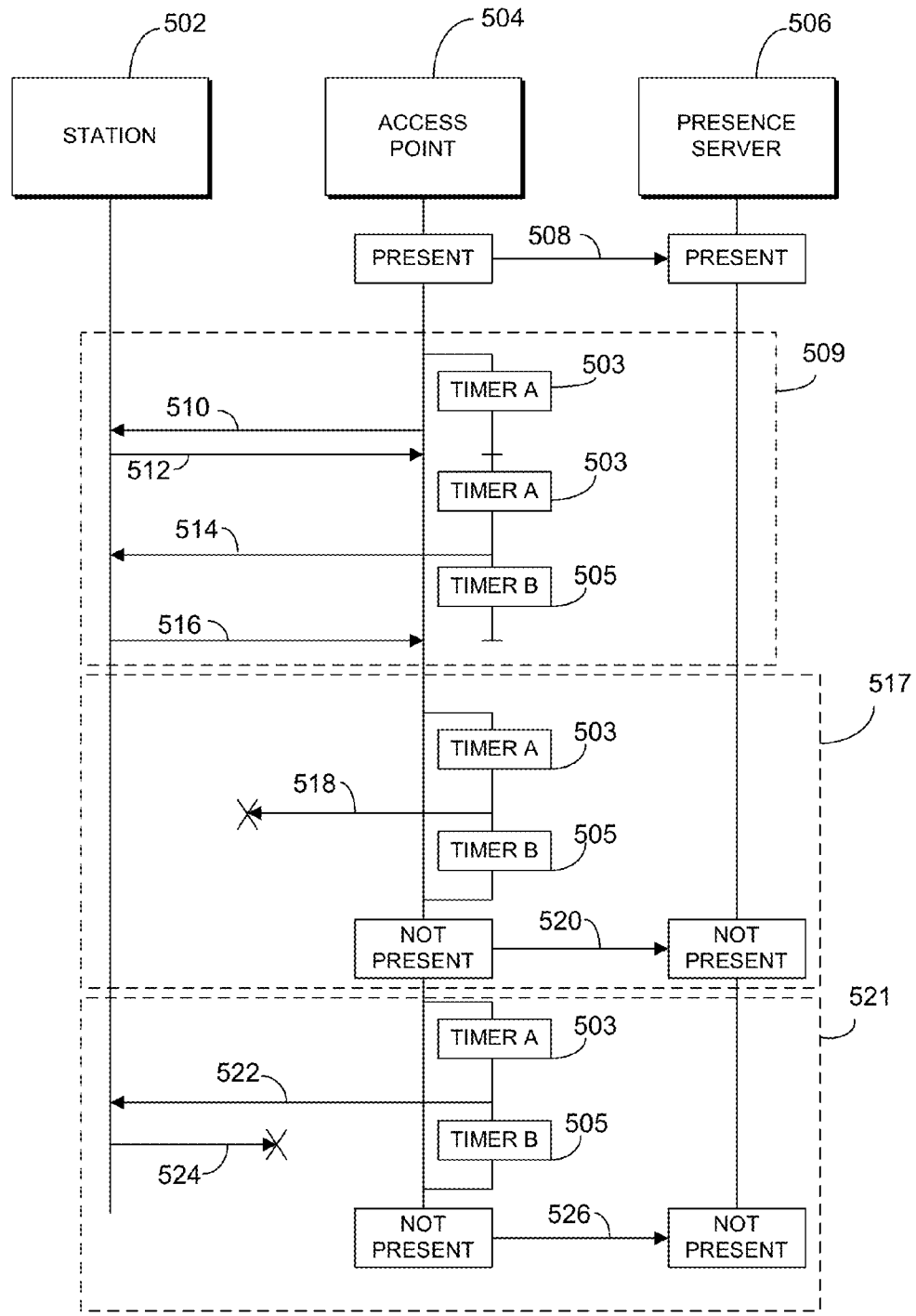
FIG. 5 is a message sequence chart illustrating a station's presence state changing from present to not present in accordance with some embodiments.

FIG. 5 is a message sequence chart 500 illustrating a station's presence state changing from present to not present in accordance with some embodiments. The message sequence chart 500 illustrates generalized messages among a station 502, AP 504, and a presence server 506. In the present message sequence chart, three particular message sequence boxes 509, 517, and 521 are shown and described. Each box 509, 517, and 521 shows different examples of message sequences scenarios and the resulting affect on the station's presence. The boxes 509, 517, and 521 and their exemplary scenarios are not meant to be read as occurring in any particular order; and each of the scenarios in boxes 509, 517, and 521 can occur without regard to any of the other scenarios.

Initially, when the station 502 associates with the AP 504, the station's presence state is set to "present," and the AP 504 indicates this to the presence server 506 via a status update message 508. The station 502 can maintain the "present" state in one or more methods in box 509. First, upon receiving some transmission from the station 502, the AP 504 commences a first timer (timer A) 503, which lasts for a first preselected period of time. During the pendency of timer A 503, the AP 504 can transmit information to the station 502 that is unrelated to presence state determination. For example, the station 502 can be operating in a powered mode, and the AP 504 can receive information for the station 502 which is transmitted 510 to the station 502 without delay or queuing without regard for timer A 503, and the station 502 responds 512 before expiration of timer A 503. While it is not a response to any presence-related transmission, the response 512 to the transmission 510 is sufficient to indicate the station 502 is still present. In a second scenario, the AP 504 commences timer A 503 upon receipt of a transmission 512 from the station 502, and upon expiration of timer A 503, the AP 504 attempts to provoke 514 a response by either transmitting information to the powered station 502, or setting a corresponding TIM bit in a beacon broadcast by the AP 504. The AP 504 then commences a second timer, timer B 505 having a second preselected timer period, which can have a different duration than timer A 503. If the station 502 responds to the attempt with a transmission 516 prior to the expiration of timer B 505, the station's presence state will remain "present."

Box 517 indicates a scenario for one way the station's presence state can change from "present" to "not present." Upon the expiration of the first timer, timer A 503, the station 502 attempts to provoke 518 a response, but the signal (either a transmission to the station 502 or the AP's beacon") is not received by the station 502. The station 502 may have moved out of coverage or into a place with low signal penetration. Accordingly, upon expiration of timer B 505 the AP 504 will not have received a response from the station 502, and the AP 504 changes the station's presence state in the AP's presence register from "present" to "not present," and informs 520 the presence server 506 of the change of state, and the presence server notes the change.

In box 521, upon expiration of timer A 503, the AP 504 attempts to provoke 522 a response from the station 502, and the attempt is received by the station 502. However, the station's response 524 does not reach the AP. Accordingly, upon expiration of timer B 505 the AP 504 will not have received a response from the station 502, and the AP 504 changes the station's presence state in the AP's presence register from "present" to "not present," and informs 526 the presence server 506 of the change of state, which notes the change.

Figure 6:
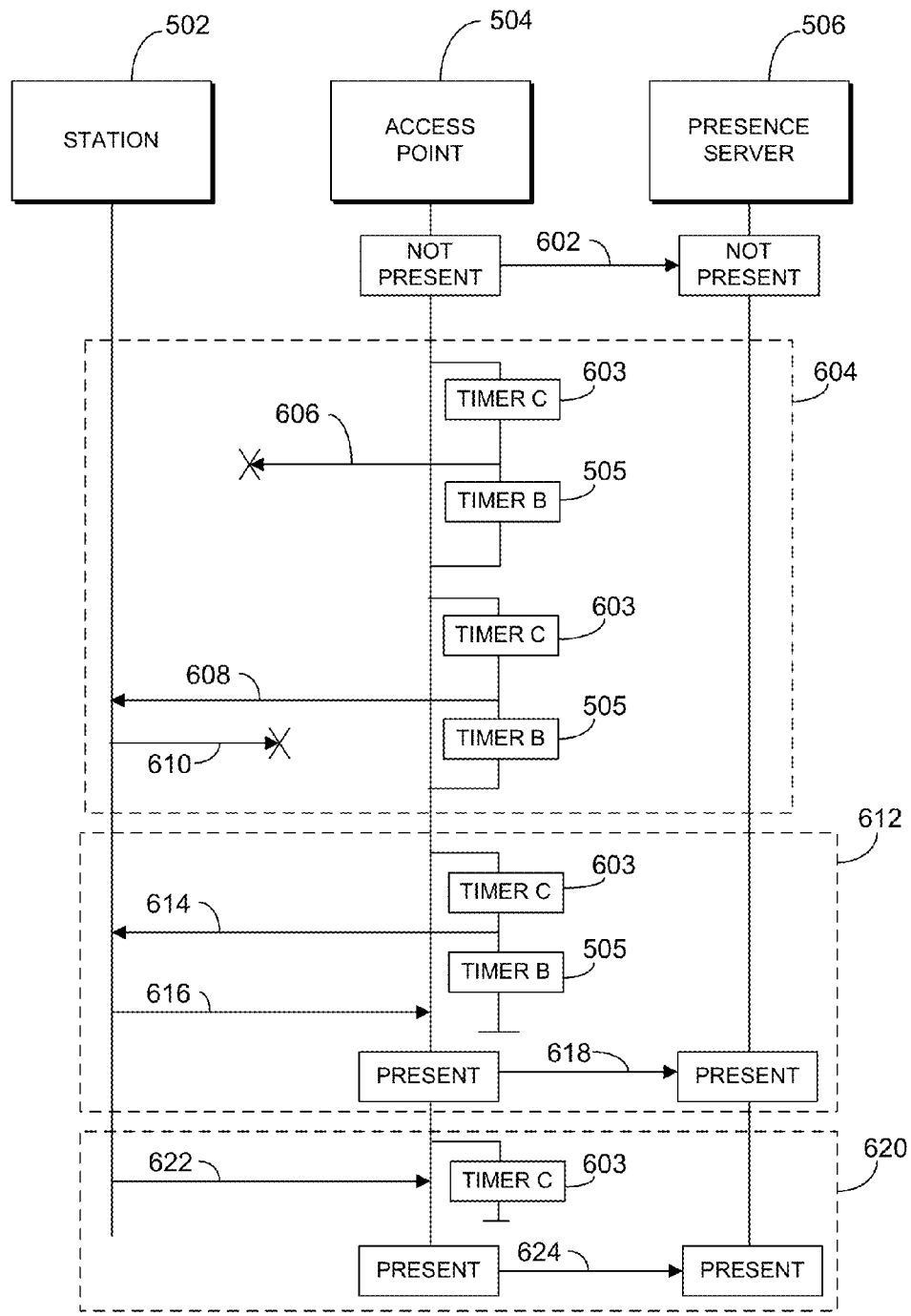
FIG. 6 is a message sequence chart illustrating a station's presence state changing from not present to present in accordance with some embodiments.

FIG. 6 is a message sequence chart 600 illustrating a station's presence state changing from not present to present in accordance with some embodiments. In the present message sequence chart, three particular message sequence boxes 604, 612, and 620 are shown and described. Each box 604, 612, and 620 shows different examples of message sequences scenarios and the resulting affect on the station's presence. The boxes 604, 612, and 620 and their exemplary scenarios are not meant to be read as occurring in any particular order; and each of the scenarios in boxes 604, 612, and 620 can occur without regard to any of the other scenarios.

Upon determining that the station's presence state is "not present," and indicating 602 such to the presence server 506, the station 502 can remain "not present" in a couple of ways, indicated in box 604. Upon first determining that the station 502 is not present, the AP 504 can commence a timer, timer C 603, which can have the same duration as other timers used, or a different duration. Upon expiration of timer C 603, the AP 504 attempts to provoke 606 a response from the station 502, which does not reach the station 502, and commences timer B 505. Since the attempt was not received by the station 502, upon expiration of timer B 505, the AP 504 will not have not received a response from the station 502, causing the AP 504 to maintain the station's presence state as "not present." Likewise, when the attempt is received 608 by the station 502, but the station's response 610 does not reach the AP 504, the AP 504 maintains the station's presence state as "not present."

In box 612, the AP's provocation attempt 614 is received by the station 502, and the station's response 616 is received by the AP 504 prior to expiration of timer B 505. Accordingly, the AP 504 changes the station's presence state from "not present" to "present" and informs 618 the presence server 506 of the change of state.

In box 620, the AP 504 commences timer C 603 after determining, or re-determining that the station 502 is not present, but before expiration of timer C 603 the station 502 transmits 622 information to the AP 504 that is unrelated to presence state determination. Accordingly, the AP 504 changes the station's presence state to "present" and informs 624 the presence server 506. Similarly, the transmission 622 can be received subsequent to the AP's attempt to provoke a response from the station 502 upon expiration of timer C 603.

Figure 7:
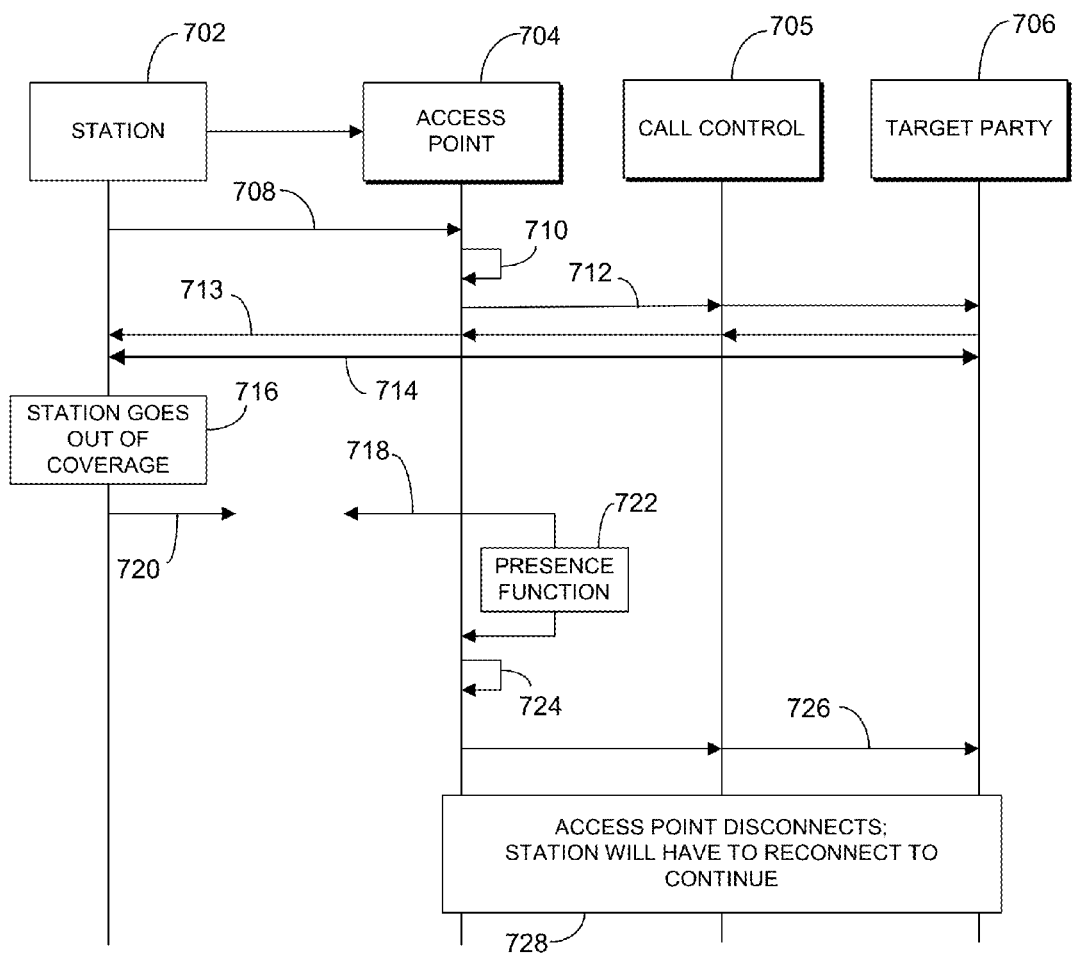
FIG. 7 is a message sequence chart illustrating an application of a station's presence state in terminating a communication in accordance with some embodiments.

FIG. 7 is a message sequence chart 700 illustrating an application of a station's presence state in terminating a communication in accordance with some embodiments. The message sequence chart 700 illustrates interactions among a station 702, AP 704, a call controller 705 and a target party 706 with whom the user of the station 702 wishes to communicate. The target party 706 therefore represents the communication equipment used by the person with whom the user of the station 702 desires to communicate. The message sequence chart 700 illustrates how presence state determination at the AP 704 can assist with calling functions relating to voice calling over WLANs. The station 702 first requests a communication by transmitting a request 708 to the AP 704. The request can be forwarded to other network entities, but the AP 704 gains an awareness 710 of the request 708. The request is forwarded 712 to the call controller 705 and subsequently to the target party 706 for answering, and setting up a call. Upon answering, a communication 713 is responded back from the target party 706 to the call controller 705 which indicates to the AP 704 that the call can commence, and the AP 704 indicates to the station 702 that the call can then commence. Accordingly, the call is commenced 714 between the station 702 and the target party 706. It will be appreciated by those skilled in the art that there can be substantial other entities involved in call set up between the station 702 and target party 706, which are not shown here for the sake of clarity. For example, the signaling between the station 702, AP 704, and target party 706 can be performed in accordance with the Session Initiation Protocol (SIP) signaling protocol. While requesting the communication and during the initial communication, the station's presence state is "present."

During the communication, the station 702 can go out of coverage 716, and either the AP's transmissions 718 do not reach the station 702, or the station's transmissions 720 do not reach the AP 704. Accordingly, the AP's presence function 722 determines that the station 702 is now "not present" 724. In conventional SIP systems, when the station 702 goes out of coverage during a communication 714, but remains associated with the AP, the communication 714 will persist at the target party 706 until the target party 706 terminates the communication. However, according to the present teachings, upon determining at the AP 704 that the station 702 is "not present," the AP 704 can commence shutting down 726 the communication with the target party 706 by, for example, an appropriate SIP message. Subsequently, the AP 704 disconnects the communication by informing the call controller 705 that the call is terminated 728. The call controller 705 then indicates call termination to the target party 706. The station 702 will have to re-commence the communication using the same procedure. It is noteworthy that the method illustrated by the sequence chart 700 of FIG. 7 does not involve a presence server, and thus the presence state as determined by the AP can be used to facilitate better communication control without regard to association state.

Figure 8:
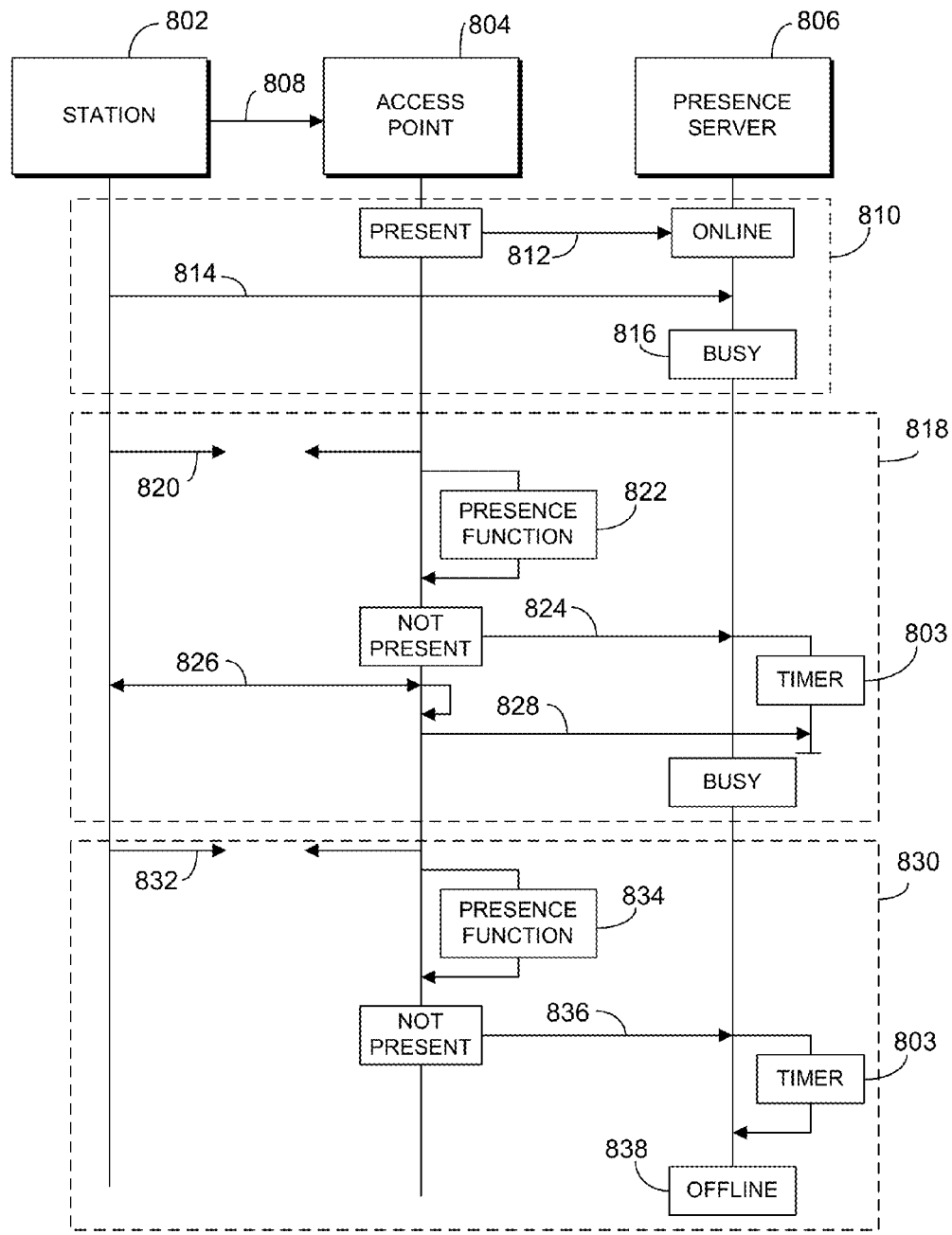
FIG. 8 is a message sequence chart illustrating use of a station's presence state at a presence server in accordance with some embodiments.

FIG. 8 is a message sequence chart 800 illustrating the use of a station's presence state at a presence server in accordance with some embodiments. The message sequence chart 800 illustrates how a presence server 806 can use presence state information from the AP 804 in conjunction with conventional presence state information from a presence application on the station 802. In the present message sequence chart, three particular message sequence boxes 810, 818, and 830 are shown and described. Each box 810, 818, and 830 shows different examples of message sequences scenarios and the resulting affect on the station's presence. The boxes 810, 818, and 830 and their exemplary scenarios are not meant to be read as occurring in any particular order; and each of the scenarios in boxes 810, 818, and 830 can occur without regard to any of the other scenarios.

The station 802 first associates 808 with the AP 804, resulting in a "present" state at the AP 804, and the AP 804 communicates 812 the "present" state to the presence server 806 in a first box 810. The presence server 806, without additional information, then sets the station's presence state to "online" for the purpose of indicating the station's presence state to other users. Subsequently, the station 802, via the station's presence application, transmits a presence update 814 to the presence server 806 indicating, for example, that the station 802 is busy. The presence application can be, for example, a calendaring application in which a user of the station 802 has set appointments, and upon the time of an appointment occurring, the station 802 transmits the "busy" state update to the presence server 806. The presence server 806, upon receiving the "busy" presence state update 814, indicates 816 the station is busy. The "busy" state does not conflict with the "present" state because "present" and "not present" indicate whether the AP can exchange signals with the station 802.

In a second box 818, the station 802 loses presence 820 with the AP 804. The AP's presence function 822 determines the loss of presence, changing the station's presence state to not present, and informs 824 the presence server 806. However, the presence server 806, according to some embodiments, does not immediately react to the change of state, as indicated by the AP 804 because "busy" indicates to other users that the station 802 can be unresponsive to communication attempts. Accordingly, the presence server 806 commences a timer 803. While the presence server's timer 803 is running, and before expiration of the timer 803, the station 802 regains 826 presence with the AP 804. The AP 804 then indicates the presence state change 828 to the presence server 806 before expiration of the timer 803. Accordingly, the presence server 806 will maintain the station's presence state as "busy."

In box 830, similarly to box 818, the station 802 loses presence 832, as determined by the AP's presence function 834. The change of state to "not present" is indicated 836 to the presence server 806. However, in this scenario, no further response is received at the presence server 806 before expiration of the timer 803. Accordingly, the presence server 806 changes the station's presence state to "offline" indicating to other users that the station 802 cannot be reached presently.

Figure 9:
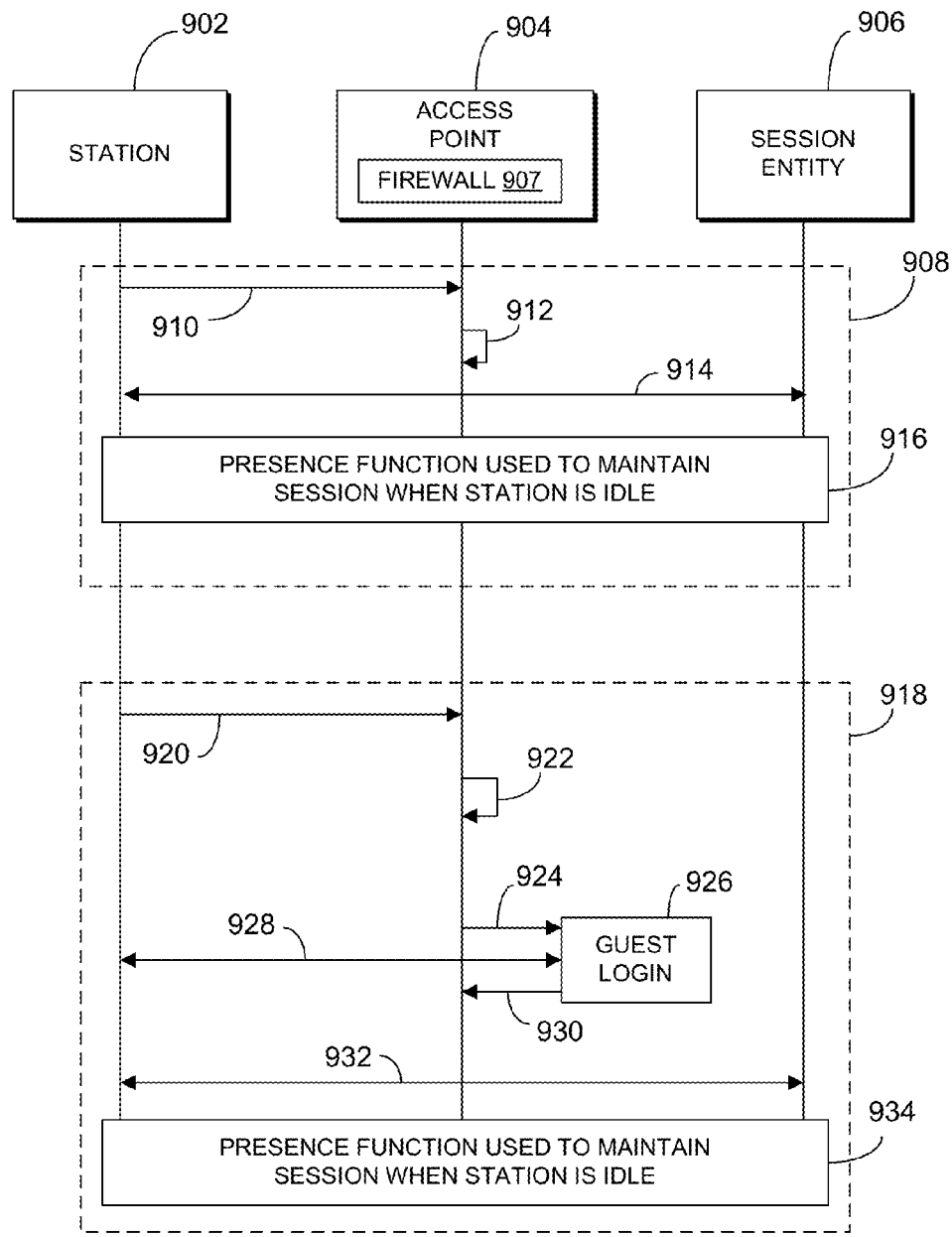
FIG. 9 is a message sequence chart illustrating how the presence function can be used to maintain session information for a station at the AP in accordance with some embodiments.

FIG. 9 is a message sequence chart 900 illustrating the use of the presence function to maintain session information for a station at the AP. The present message sequence chart 900 illustrates a station 902, AP 904, and a session entity 906. The session entity can be any entity with which the station can establish a session, and can be, for example, a website, another station, and so on. In the present message sequence chart, two particular message sequence boxes 908 and 918 are shown and described. Each box 908, 918 shows different examples of message sequences scenarios and the resulting affect on the station's presence. The boxes 908, 918 and their exemplary scenarios are not meant to be read as occurring in any particular order; and each of the scenarios in boxes 908, 918 can occur without regard to any of the other scenarios.

In a first box 908 the station 902 is an authenticated station. The station 902 first attempts 910 to access the session entity 906 through the AP 904. The AP contains a stateful firewall 907 that maintains session information and presence information for sessions engaged by the station 902. Accordingly, the firewall 907 initiates 912 session information. The station 902 and session entity 906 commence 914 a session. In such a session, it is not uncommon for both the station 902 and session entity 906 to become idle at the same time, meaning that they do not send traffic for a period of time. Ordinarily the firewall 907 would flush the session information after an idle period on the assumption that the station 902 has gone offline. In some embodiments, however, the AP's presence function is used to inform the firewall 907 that the station 902 is still present 916, which the firewall 907 will respond to by maintaining the session information as long as the station 902 is present. The AP's presence function uses only WLAN layer messaging which requires no higher application layer processing by the station 902, such as, for example, transmitting a null frame, as shown in box 509 of FIG. 5.

In another box 918, the station 902 attempts to access the session entity 906 through the AP 904 as a guest. The station 902 first requests access 920. The AP 904 determines 922 that the station 902 is a guest. The AP 904 then invokes 924 a guest registration or guest login 926. The guest login can be, for example, a website used to verify 928 the station's credentials and informs 930 the AP 904 that the station 902 can commence operation. The firewall 907 then sets up session information for the station 902, and the station 902 can thereafter commence 932 a session with the session entity 906. The AP's presence function is then used to maintain the station's presence with the firewall 907 so that even if the session becomes idle, so long as the station 902 maintains presence the station 902 will not have to go through the guest login procedure 926.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that can cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like can be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but can include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but can also be configured in ways that are not listed.

It will be appreciated that some embodiments can be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method, comprising:
receiving, at a presence server, a presence state update indicating that a station associated with an access point to which the presence server is operably coupled has a "present" state, and wherein the access point includes a stateful firewall;
updating a state register at the presence server to indicate the "present" state of the station;
receiving from the station a state modifier indicating a "busy" present state;
updating the state register to indicate the "busy" present state;
receiving from the access point, subsequent to the access point being unable to communicate with the station due to its being busy, an indication that the station is "not present";
subsequent to receiving the "not present" state update of the station from the access point, maintain the "busy" state of the station in the state register at the presence server until no further state update is received from either the access point or the station for a preselected period of time and maintain session information for the station in the firewall; and
changing the state of the station to "not present" in the state register at the presence server upon expiration of the preselected period of time and flushing the session information for the station from the firewall.

2. A presence server, comprising:
a state register operable to indicate a presence state of a station; and
a controller coupled to the state register and operable to:
- receive a presence state update indicating that a station associated with an access point to which the presence server is operably coupled has a "present" state, and wherein the access point includes a stateful firewall;
- update the state register at the presence server to indicate the "present" state of the station;
- receive from the station a state modifier indicating a "busy" present state;
- update the state register to indicate the "busy" present state;
- receive from the access point, subsequent to the access point being unable to communicate with the station due to its being busy, an indication that the station is "not present";
- subsequent to receiving the "not present" state update of the station from the access point, maintain the "busy" state of the station in the state register until no further state update is received from either the access point or the station for a preselected period of time while session information for the station is maintained in the firewall; and
- change the state of the station to "not present" in the state register upon expiration of the preselected period of time while the session information for the station is flushed from the firewall.

* * * * *